United States Patent [19]

Matui

[11] 4,360,835
[45] Nov. 23, 1982

[54] TELEVISION CAMERA OBJECTIVE HAVING DRIVING MECHANISM FOR ADJUSTING COMPONENTS OF ITS OPTICAL SYSTEM

[75] Inventor: Nobuo Matui, Hasuda, Japan
[73] Assignee: Fuji Photo Optical Co., Ltd., Omiya, Japan
[21] Appl. No.: 217,122
[22] Filed: Dec. 17, 1980

[30] Foreign Application Priority Data

Dec. 24, 1979 [JP] Japan .................. 54-167938

[51] Int. Cl.³ ............................................. H04N 5/26
[52] U.S. Cl. ........................................ 358/225; 358/227
[58] Field of Search .................. 358/209, 225, 227; 352/139, 140

[56] References Cited
U.S. PATENT DOCUMENTS 3,283,231 11/1966 Askew ..................... 358/227 X
4,237,492 12/1980 Roth et al. .................. 358/225

Primary Examiner—Robert L. Richardson
Attorney, Agent, or Firm—Young & Thompson

[57] ABSTRACT

A television camera objective has a driving mechanism for adjusting components of its optical system and is adapted selectively replaceably to receive either a servo control driving unit or a manual control driving unit. Either type of driving unit has a driving shaft that engages with a rotary transmission shaft that remains in place on the driving mechanism. To prevent the transmission shaft from rotating in the absence of a driving unit, the transmission shaft has a flange against which a sliding sleeve is spring urged into braking frictional engagement. The introduction of the driving unit pushes back this sleeve to disengage the frictional surfaces and release the transmission shaft for rotation. In addition, the sleeve can be manually pulled back and rotated to lock it in a disengaged position, so as intentionally to free the transmission shaft for rotation in the absence of a driving unit.

15 Claims, 4 Drawing Figures

FIG. 2
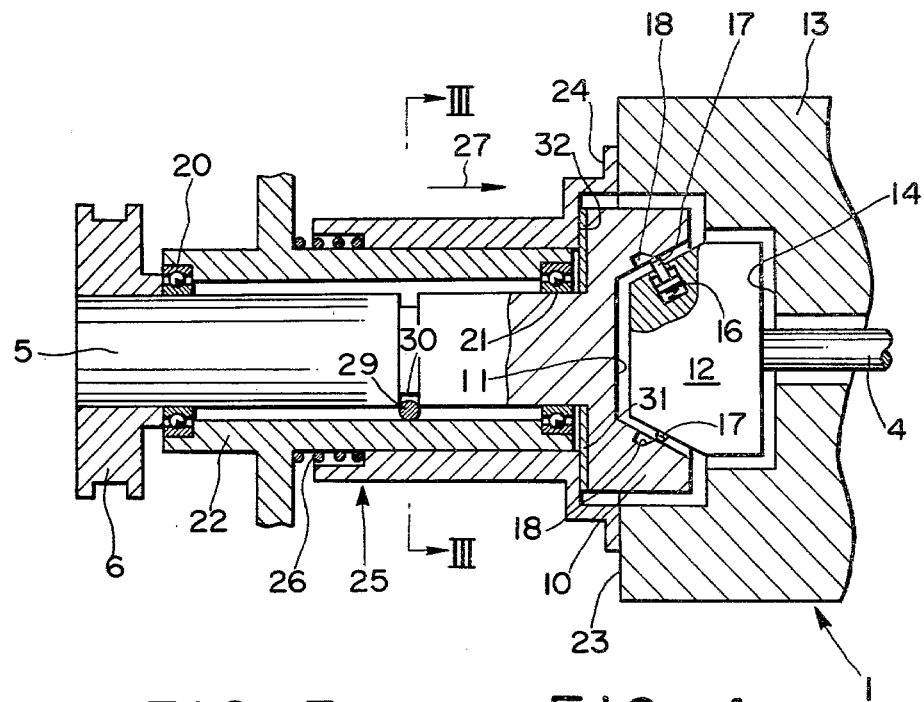
FIG. 3
FIG. 4
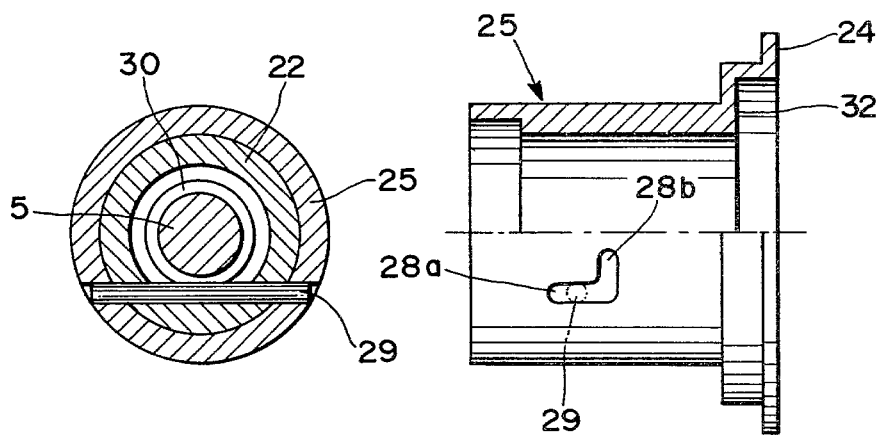

TELEVISION CAMERA OBJECTIVE HAVING DRIVING MECHANISM FOR ADJUSTING COMPONENTS OF ITS OPTICAL SYSTEM

BACKGROUND OF THE INVENTION

The present invention relates to a television camera objective having a driving mechanism for adjusting components of an optical system, and more particularly relates to such an objective including an engaging mechanism for preventing a transmission shaft from rotating in the absence of a driving unit for controlling focusing components.

In usual television camera objectives having a driving mechanism for adjusting components of an optical system, a controlled displacement of at least one component of the optical system is caused by a driving force which, in turn, is transmitted from a driving unit to a lens component displacing mechanism through a transmission shaft. In zoom lenses, in which the focal length is variable, correlative displacements of lens components for varying the focal length and for compensating are attended by variations of magnification ratio. On the other hand the focusing control of an objective is performed by an axial displacement of focusing lens components. In standard television camera objectives, there are provided driving force transmission mechanisms on which driving units identical in their construction are detachably mounted for zooming control and focusing control.

There are two well known types of driving units. One of them is a servo control driving unit, or so-called servo module, into which a servo motor is built for motor-operated zooming control or motor-operated focusing control. The other is a manual control driving unit, or so-called manual module, having a flexible cable through which zooming or focusing control commands are manually given by an operator. Such driving units are a servo module or a manual module are selectively mounted on the driving force transmission mechanism according to the contemplated mode of operation.

Such driving units as described hereinbefore are usually demounted from the driving force transmission mechanism during shipment from the factory or during transportation from one studio to another. Generally, objectives for use with television cameras have an optical system with a large aperture number and components which are quite heavy in weight. Consequently, upon the objective without driving units being inclined, one or more movable lens components can shift in position. Such motions of these movable lenses finally cause the guide pin of a movable lens holder to come into collision with the end of a cam slot formed on a camming cylinder. As a result of that, the guide pin and/or cam slot can be damaged, and the movable lenses can break by impact of the guide pin and movable lens holder.

OBJECTS OF THE INVENTION

It is accordingly a principal object of the present invention to provide a television camera objective having a driving mechanism for adjusting components of an optical system, in which at least one movable lens component is prevented from accidentally moving in the absence of a driving unit on a transmission shaft.

Another object of the present invention is to provide a television camera objective having a driving mechanism for adjusting components of an optical system and which is adapted to allow or obstruct the rotation of a transmission shaft, depending on whether or not a driving unit is mounted on the transmission shaft.

Finally, it is an object of the present invention to provide a television camera objective having a driving mechanism for adjusting components of an optical lens system, in which an engaging member for obstructing the rotation of a transmission shaft can be selectively moved to a position in which the engaging member allows the transmission shaft to rotate.

SUMMARY OF THE INVENTION

The objects of the invention described above are achieved by the provision of a television camera objective which has a detecting member adapted to be displaced from a first position to a second position by the operation of coupling a driving unit with a transmission shaft and an engaging member which is forced to shift by the displacement of the detecting member. The engaging member is adapted to prevent the transmission shaft from rotating by its engagement with a part of the transmission shaft when the detecting member is in the first position but to allow the transmission shaft to rotate upon its disengagement therefrom when the detecting member is in the second position. The engaging member comes into contact with and brakes the transmission shaft to obstruct the rotation thereof. Although the engaging member and the detecting member are referred to as two separate members, it is desirable to unite these two as one member.

BRIEF DESCRIPTION OF THE DRAWINGS

These and other objects, features and advantages of the present invention will become apparent from a consideration of the following description, taken in conjunction with the accompanying drawings, in which:

FIG. 2 is a sectional view illustrating the principal parts of the present invention;

FIG. 3 is a cross-sectional view taken along line III—III in FIG. 2; and

FIG. 4 is a side view, the upper half in section, of the engaging member.

DETAILED DESCRIPTION OF THE INVENTION

Figure 1:
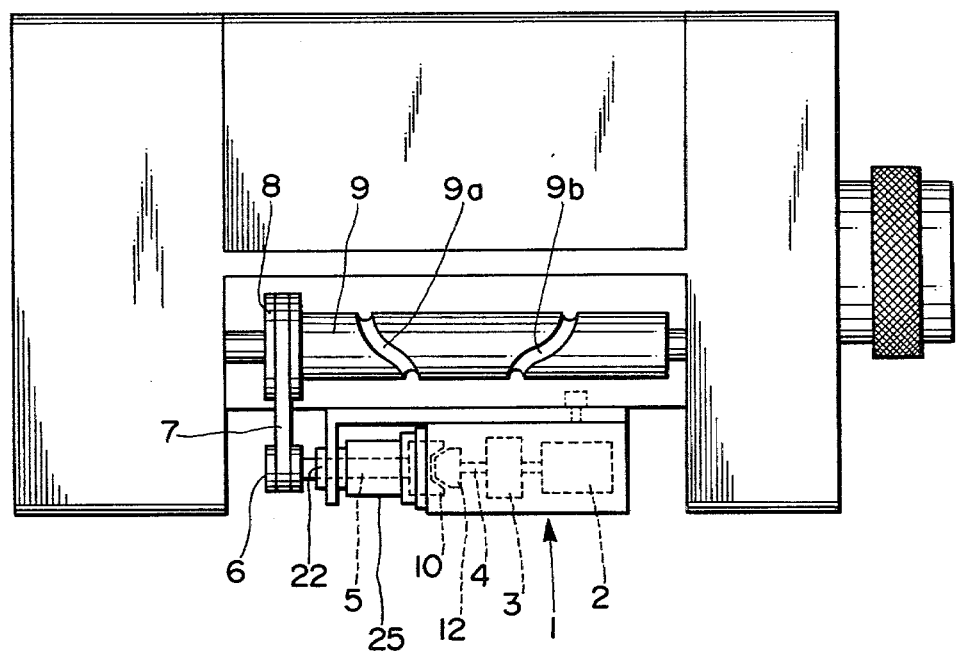
FIG. 1 is a side elevational view, with the cover removed, of a preferred embodiment of the present invention.

Referring now to the drawings in greater detail, in FIG. 1 there is shown a television camera objective with the side cover removed, including a driving unit, for example a servo module driving unit 1 having a servo motor 2 therein, which is detachably mounted on the objective. The driving force produced by the servo motor 2 is transmitted to a driving shaft 4 through a reduction gear 3 and causes a transmission shaft 5 to rotate. A belt pulley 8 fixed to the end of a cylindrical shaft 9, which in turn is formed with two curved cam slots 9a and 9b on its outer surface, is rotated by a drive belt 7 and a pulley 6 fixed to the end of the transmission shaft 5.

Upon the camming cylinder 9 rotating, two lens holders (not illustrated), on which two movable lens components are mounted separately and each of which is slidably engaged with respective ones of the cam slots on the camming cylinder 9, are caused to be displaced axially with these followers guided by a straight guide provided on a fixed cylinder (not illustrated). Consequently, two movable lens components such as a lens of variable focal length and a compensating lens (not illustrated, nor are the other lens components comprising a zoom lens system) are correlatively displaced along an optical axis a distance corresponding to the amount of rotation of the camming cylinder shaft 9, so as properly to vary the focal length. Such an assembly of camming cylinder shaft 9, lens holders and a fixed cylinder comprise a well-known lens displacement control mechanism.

Referring now to FIG. 2, on the end of the transmission shaft 5 opposite pulley 6, a coupling head 10 similar to a flange is provided. The coupling head 10 of the transmission shaft 5 is provided with a frusto-conical depression 11 which coacts with a complementarily shaped coupling head 12 on the end of driving shaft 4. The coupling head 12 is accommodated in a recess 14 on a housing 13 of the servo module 1. A plurality of engaging pins 17 are urged by biasing coil compression springs 16 so as to retractably project from the truncated conical surface of the coupling head 12. Therefore, as the coupling head 12 of the driving shaft 4 is inserted into the frusto-conical depression 11 of the coupling head 10 of the transmission shaft 5, the interconnection between these two shafts 4 and 5 is completed by pins 17 seating in recesses 18 formed on the truncated conical surface of the frusto-conical depression 11 of the transmission shaft 5.

The transmission shaft 5 is rotatably carried by a cylindrical fixed rigid member 22 through ball bearings 20 and 21 interposed therebetween as shown in FIG. 2. The cylindrical rigid member 22 is surrounded by an engaging member 25 the rear end of which has a flanged portion 24 adapted to come into abutment against a front wall 23 of the housing 13, the engaging member 25 being biased in the direction of the arrow 27 as shown in FIG. 2 by means of a coil compression spring 26 and being axially slidable and rotatable through only a portion of one turn.

As shown in FIG. 4, the engaging member 25 is restricted in its sliding movements by an axial slot 28a formed thereon and a rigid rod 29 described hereinafter coacting with the slot 28a. The engaging member 25 is further restricted in rotation by a peripheral slot 28b formed thereon and by the rigid rod 29.

Turning now to FIG. 3, the cylindrical rigid member 22 holds fixedly and rigidly the rod 29 which is fitted into an annular groove 30 on the transmission shaft 5 and is further selectively engaged with slots 28a or 28b so as to restrict the sliding or rotating motion of the engaging member.

On the front face of the coupling head 10 of the transmission shaft 5 an annular member 31 having a relatively high frictional resistance is secured. The annular member 31 serves to prevent the transmission shaft from rotating when member 31 frictionally engages with the surface 32 of the engaging member 25. Obviously, the same result is achieved if the annular frictional member 31 is instead secured to the opposed engaging surface of the engaging member 25.

In the operation of a television camera objective embodying the present invention, as illustrated in FIGS. 1 and 2, the housing is formed along one of its rectangular surfaces with a slot (not shown) adapted to receive a bayonet lug (see FIG. 1) on the casing of servo module 1, whereby the module casing may be emplaced in its socket by transverse and longitudinal motion to introduce the lug into the slot while connecting the driving shaft 4 with the transmission shaft 5 through coupling heads 10 and 12. Longitudinal advancement of the servo module 1, in the direction opposite to that of arrow 27 in FIG. 2, causes the engaging member 25 to move axially against the biasing force of spring 26 with its guide slot 28a engaging with the rigid rod 29 secured to the cylindrical rigid member 22.

At the end of the longitudinal advance of the servo module 1, the driving shaft 4 and the transmission shaft 5 are interconnected with each other through the engagement between guide pins 17 and bores 18. After the completion of the interconnection of the servo module 1 and the transmission shaft 5, engaging surface 32 of the engaging member 25 is spaced from the annular frictional member 31 so that the driving force produced by the servo motor 2 is allowed to be transmitted to the transmission shaft 5 through coupling 10 and 12 without obstruction by the engaging member 25. Consequently the zoom lens system is servo-controlled to vary its focal length by the servo module 1.

Upon the servo module being required to be demounted, it may be enough to displace the casing from its socket by longitudinal (toward the arrow 27 shown in FIG. 2) and transverse motion to withdraw the lug from the slot while disconnecting the driving shaft 4 from the transmission shaft 5 through disengagement between coupling heads 10 and 12. On this occasion, the engaging member 25 is gradually moved in the direction of arrow 27 under the influence of the force of the biasing spring 26 with the withdrawing of servo module 1 and finally the surface 32 of the engaging member 25 will come into contact with the annular frictional member 31 secured to the coupling head 10 of the transmission shaft 5.

Thereafter, the cylindrical rigid member 22, with the axial slot 28a engaged by the rigid rod 29, prevents the engaging member 25 from rotating, so that the transmission shaft is prevented from rotating, thanks to the frictional engagement between surface 32 and member 31.

As is apparent from the above description, even though a television camera objective without driving units is tilted by mistake during its shipment from the factory or transportation or the like, the movable lens components will be prevented from falling by gravity due to the fact that the engaging member 25 is in contact with the annular frictional member 31.

Furthermore when it is required to manually operate a television camera objective for zooming control without a servo module driving unit, that is, when it is desirable to adjust the focal length of the optical system through the transmission shaft 5 being operated manually and directly by an operator, the engaging member 25 is slid with axial and circumferential motion along slots 28a and 28b and locks in slot 28b against the force of the biasing spring 26, with the result that the engaging member 25 is kept disengaged from the transmission shaft 5. Consequently, the transmission shaft 5 can rotate under an extremely light load.

While the preferred embodiment of the present invention described above is explained with reference to a television camera objective with a servo module driving unit, the present invention can be applied to a television camera objective using a manual module driving unit in the same way as a servo module driving unit. And the present invention can be applied not only to a zooming control mechanism but also to a focusing control mechanism of a television camera objective, the latter being, as a matter of course, identical in design and results, no matter whether the driving unit is a servo module or a manual module.

Naturally, the invention is not limited to the specific details described and illustrated but may be modified in various respects without departing from the spirit and scope of the invention as defined by the appended claims.

What is claimed is:

1. In a television camera objective having a transmission shaft to which a driving unit is adapted to be detachably connected and a driving mechanism for axially displacing at least one lens component of an optical system upon rotation of said transmission shaft; the improvement comprising:

means movable from a first position when said driving unit is dismounted from said transmission shaft to a second position when said driving unit is mounted on said transmission shaft, and means releasably interconnecting said first-named means and said transmission shaft for preventing said transmission shaft from rotating upon said first-named means being in said first position but allowing said transmission shaft to rotate upon said first-named means being in said second position.

2. A television camera objective as claimed in claim 1, in which said first-named means is moved from said first position to said second position by engagement with said driving unit upon connection of said driving unit to said objective.

3. A television camera objective as claimed in claim 1, and spring means biasing said first-named means toward said first position.

4. A television camera objective as claimed in claim 1, said first-named means engaging a portion of said transmission shaft in said second position to prevent rotation of said transmission shaft.

5. A television camera objective as claimed in claim 4, said first-named means and said transmission shaft having surfaces that frictionally engage each other in said second position to brake said transmission shaft.

6. A television camera objective as claimed in claim 1, and means for selectively locking said first-named means in said second position.

7. A television camera objective having a driving mechanism for axially displacing at least one lens component of an optical system by driving force transmitted from a detachable driving unit, said driving mechanism including a rotatable transmission shaft for receiving and transmitting driving force from said driving unit, a coupling element on one end of said transmission shaft selectively engageable with a complementary coupling element of said driving unit, a fixed member supporting said transmission shaft for rotation, engaging means slidably surrounding said fixed member, means on said transmission shaft engageable with said engaging means in a first position of said engaging means to prevent rotation of said transmission shaft, spring means yieldably urging said engaging means toward said first position, said engaging means being engageable with a said driving unit upon attachment of said driving unit to said objective to move said engaging means from said first position to a second position in which said engaging means is spaced from said engageable means on said transmission shaft, and means preventing rotation of said engaging means in said first position.

8. A television camera objective as claimed in claim 7, said rotation preventing means comprising pin and slot means between said engaging means and said fixed member.

9. A television camera objective as claimed in claim 7, said driving unit having a driving shaft, said driving shaft and said transmission shaft having enlarged adjacent ends which detachably couple together upon mounting of said driving unit on said objective.

10. A television camera objective as claimed in claim 9, said engaging unit being engageable with said enlarged end of said transmission shaft in said first position.

11. A television camera objective as claimed in claim 9, said enlarged ends of said shafts having complementary frusto-conical surfaces that mate to transmit rotation from said driving shaft to said transmission shaft.

12. A television camera objective as claimed in claim 11, said enlarged end of said transmission shaft having a friction surface on its side opposite its said frusto-conical surface, said friction surface frictionally engaging said engaging means to brake said transmission shaft in said first position.

13. A television camera objective as claimed in claim 7, said engaging means having frictional engagement with an enlarged portion of said transmission shaft to brake said transmission shaft in said first position.

14. A television camera objective as claimed in claim 7, and means for selectively locking said engaging means in said second position in the absence of a said driving unit.

15. A television camera objective as claimed in claim 14, said engaging means comprising a cylindrical sleeve, said locking means comprising pin and slot means that act between said sleeve and said fixed member, said slot means having a portion that extends peripherally of said sleeve to lock said engaging means in said second position and a portion that extends parallel to the axis of said sleeve to receive said pin and to prevent rotation of said sleeve in said first position.

* * * * *